Patented May 17, 1949

2,470,132

UNITED STATES PATENT OFFICE 2,470,132

WELL WASHING FLUID AND METHOD OF USING THE SAME

William E. Bergman, Bartlesville, Okla., assignor to Phillips Petroleum Company, a corporation of Delaware No Drawing. Application August 18, 1947, Serial No. 769,315

3 Claims. (Cl. 252—8.55)

This invention relates to a well washing fluid and methods of using the same. In one specific embodiment it relates to well washing fluid containing alkali metal (especially sodium, potassium and lithium) or ammonium carboxymethylcellulose or alkali metal (especially sodium, potassium and lithium) or alkaline earth metal (especially magnesium, calcium, barium and strontium) or ammonium alpha or beta carboxyethyl cellulose ethers from 1 to 5% by weight in water solution containing 1,000 to 25,000 P. P. M. of alkali metal halides or alkaline earth metal halides (especially sodium, potassium, lithium, magnesium, calcium, barium and strontium halides and more especially the chlorides of such metals).

In drilling oil or gas wells into an oil producing formation a drilling mud is often employed in order to control by hydrostatic pressure any premature flow of oil or gas into the well. This drilling mud forms a filter cake on the walls of the producing formation which filter cake tends to hamper the flow of oil into the well.

In order to complete the well after it is drilled it is necessary to replace this column of mud with a fluid having less specific gravity and the mud filter cakes should be washed from the surface of the well during this replacement.

In the prior art water has been used to replace mud with resulting permanent injury to the productive ability of the well, especially where bentonites are present in any degree in the oil producing sand. The water hydrates the bentonites which swell and plug the oil producing formation to such an extent that the rate of producing ability of the well is often more than cut in half. Also swelling of bentonite or heaving shale, or cracking and caving of clays, such as kaolin, above the producing formation may cause closure of the hole or loss of the well.

I have found that by employing the above mentioned water soluble salts of the above mentioned carboxyalkyl cellulose ethers in a water solution along with sufficient saline material that any disintegration, swelling or plugging by clays or bentonites in the oil producing formation is substantially prevented and that wells containing such oil producing formation may be washed without any substantial loss in production whereas when washed with water they would lose substantially one half of their entire production over the entire period of the use of the well.

One object of this invention is to provide a suitable method of washing wells and a suitable well washing fluid which will not decrease the probable future production of the well by any substantial amount.

Another object is to produce an improved well washing fluid.

Another object is to produce an improved method of washing wells.

Numerous other objects and advantages will be apparent to those skilled in the art from reading the accompanying specification and claims.

The well washing fluid of the present invention is substantially free of any clay or bentonitic material or any solid suspended materials and comprises water to which is added 1 to 5 per cent by weight of a water soluble salt of a carboxyalkyl cellulose ether preferably selected from the group consisting of sodium, potassium, lithium and ammonium carboxymethylcellulose or beta carboxyethyl cellulose ether and magnesium, calcium, barium and strontium beta carboxyethyl cellulose ether. Corresponding salts of alpha carboxyethyl cellulose ether may be employed with substantially the same results as the corresponding beta carboxyethyl cellulose ether salts mentioned. To this water solution is also added from 1,000 to 25,000 P. P. M. alkali metal or alkaline earth metal halides preferably the cheaper and more available ones such as sodium or calcium chloride. Hereinafter this well washing fluid described in this paragraph will be designated as my well washing fluid.

In the operation of my invention after the well is drilled with any type of drilling mud the well is washed by replacing the drilling mud in the well with my well washing fluid. My well washing fluid may be pumped down a pipe into the well and come up around the pipe driving the drilling mud out of the well ahead of it or it may be employed by forcing my well washing fluid down the annulus around the pipe in the well and forcing the drilling mud up through the pipe. In either instance my well washing fluid replaces the drilling mud in the well. Or the drilling mud may be removed by swabbing or boiling followed by washing with my well washing fluid. My well washing fluid may be removed by swabbing or boiling.

According to recently developed concepts of the structure of clay minerals, the lattice structure of bentonite consists of one gibbsite sheet between two sheets of tetrahedral silica groups. These units are loosely held together with water present between them, and the mineral is said to have an expanding lattice since the distance between the units may vary with the water content and the type of exchangeable ions. With kaolin there is one gibbsite sheet with one of tetrahedral silica and the lattice does not expand with varying water content. Thus the external structure of these two clays is closely analogous. Differences in the physical-chemical properties are largely associated with the internal structure available with the bentonite mineral.

EXAMPLE A

Wells A and B are in the same oil producing formation. In well A water is employed to wash the well. In well B the well is washed with my well washing fluid instead of water. The following results are obtained:

Table I

|  | Well "A" | Well "B" |
| --- | --- | --- |
| Initial Production | 600 bbls. per day | 1200 bbls. per day. (Was still flowing). |
| Maximum pumping rate reached after 9 months pumping. | 61 bbls. per day |  |
| Flowing rate after 9 months. | (Required pumping) | 121 bbls. per day. |
| Total gross production | 70,000 bbls. in 10 yrs. | 80,000 bbls. in 4 yrs. |

The above figures clearly show how badly water can injure an oil formation and how the same may be protected by the use of my well washing fluid in place of water.

EXAMPLE B

In the process of developing my well washing fluid the following experiments were performed on bentonite and kaolin materials as well as fragments of core sections from various wells in order to determine the proper proportions to employ in order to prevent the swelling or disintegration of the same.

The pertinent materials used for these experiments were:

a. Sodium carboxymethylcellulose, a Hercules product, designated as Odessa, low-viscosity product.

b. Bentonite, a Baroid Company product distributed under the trade name of "Aquagel." Bentonite is a loosely used word to describe a natively occurring clay deposit. The clay fraction of the deposit is generally composed of 90 per cent of more of a specific mineral, montmorillonite.

c. Kaolin, or the so-called "china clay" distributed by the Aluminum Flake Company of Akron, Ohio.

d. Core sections from various wells.

e. Solutions of various salts, especially of sodium chloride and calcium chloride. Concentrations of salt used, expressed in parts per million were: 500; 1,000; 5,000; 10,000; 50,000; and 100,000.

Most of the qualitative observations upon the effect of carboxymethylcellulose and the salt solutions, either separately or in conjunction with each other, on the swelling and disintegration were made by placing pellets of the clays or pieces of the core sections in 25 ml. of solution containing known concentrations of carboxymethylcellulose and added electrolytes. The pellets were prepared by compression of the clay in a pelleting machine using a force of 1 to 2.5 tons per pellet. The cylindrical pellets were 6.3 mm. in diameter and approximately 6 mm. in length. No binder was used in the preparation. The apparent density of the bentonite pellets, determined by displacement of mercury, was found to be 2.1 g./cc.

The effect of carboxymethylcellulose in the absence of added electrolytes is a function of the concentration of carboxymethylcellulose. In the absence of carboxymethylcellulose the swelling of the bentonite continues until the pellet is a very soft plastic mass surrounded by a diffuse layer of clay particles. Slight agitation is sufficient to completely disperse the clay. As the concentration of carboxymethylcellulose for a given salt concentration is increased the apparent swelling is decreased. Fracturing of the pellets evidently first occurs along "faults" in the pellet since the pellets were made by compression of several small batches of the clay until the desired size was obtained.

Concentrations of salt used, expressed in parts per million were; 1,000; 10,000; 50,000 and 100,000. In the absence of carboxymethylcellulose, the pellets in such salt solutions disintegrate rapidly, the rate of disintegration increasing markedly with increase in concentration of sodium chloride. With 100,000 P. P. M. of brine, the bentonite pellet is essentially disintegrated in about ten minutes whereas with 50,000 P. P. M. about four hours is required to achieve the same degree of disintegration. However, with the higher salt concentration the bentonite remains in a flocculated condition. Carboxymethylcellulose markedly decreases the rate of disintegration of these pellets in brine solution and, in fact, the effect of the salt is nearly eliminated.

The effect of 0, 500, 1,000 and 5,000 P. P. M. calcium chloride solution, with and without 1 per cent carboxymethylcellulose, is not unlike those discussed for sodium chloride. In addition the calcium exchanges with some of the sodium originally present on the clay to produce essentially a calcium clay which, by virtue of the lower hydration of calcium as compared with sodium and since one calcium ion is equivalent to two sodium ions in the exchange, produces a less swollen clay.

The pellets of bentonite were also placed in eight mm. tubes and covered with 1 per cent carboxymethylcellulose and water, respectively. The decrease in the apparent swelling volume due to the presence of carboxymethylcellulose is striking. This is also shown by the tabulated data following, which gives the height of the swollen material as a fuction of time.

Table II

| Time, hours | Apparent 1% CMC | Height, mm. water |
| --- | --- | --- |
| 0 | 7 | .7 |
| 0.3 | 9 | 9 |
| 1.3 | 9 | 10 |
| 3 | 10.5 | 13 |
| 5 | 11 | 14 |
| 30 | 16 | 22 |
| 53 | 17.5 | 24 |
| 76 | 18.5 | 25.5 |
| 100 | 19.5 | 27.0 |
| 336 | 25.0 | 36 |

With kaolin the results of tests were the same in water or brine solutions — the pellets disintegrated within five minutes and there was no difference in the rate of disintegration in these solutions. With one to five per cent carboxymethylcellulose, the rate of disintegration in water was decreased, the pellets remaining intact for 1–2 hours. The addition of 1,000 to 25,000 P. P. M. of sodium chloride enhanced the effect of the carboxymethylcellulose such that the pellets essentially retained their original size and shape although partially cracked.

The core sections from the various wells were used in experiments analogous to those described above with kaolin and with bentonite. The results showed that my well washing fluid would prevent swelling or disintegration of these materials also.

To summarize, these results showed:

1. In the absence of sodium carboxymethylcellulose, pellets of bentonite swell and readily disperse in water. Pellets of kaolin disintegrate without marked swelling in water.

2. Sodium or calcium chloride solutions, in the absence of carboxymethylcellulose, produce rapid disintegration of pellets prepared from these materials. Calcium salts decrease the apparent swelling of bentonite.

3. With one to five per cent carboxymethylcellulose, the swelling or dispersibility of pellets of these clays is markedly decreased, and the effect of carboxymethylcellulose is enhanced by the presence of about 1,000 to 25,000 P. P. M. or more of either calcium or sodium chloride. The effect of carboxymethylcellulose in dilute (0.01 N) acid or alkali is not appreciably decreased, except, of course, that the apparent swelling of bentonite is increased in alkali and decreased in acid.

4. Core sections from various wells did not swell or disintegrate in my well washing fluid.

From the above experiments it is evident that my well washing fluid is vastly superior to water or to brine solutions, and is capable of carrying out the objects of the invention. The above simple experiments are merely representative and are given to show how my well washing fluid can function in washing wells. It is to be understood that while a theory of operation has been advanced it is not necessarily the only theory nor the true theory accounting for the superiority of my well washing fluid, but the theory has only been advanced in order to facilitate the disclosure. It is understood, however, that this invention is not limited to any theory of operation or action. It is further obvious that changes may be made in the details of the invention without departing from the spirit and scope of the invention as defined in the following claims.

Having described my invention I claim:

1. The process of washing an oil or gas well containing a well drilling mud comprising the steps of replacing the drilling mud in the well with a well washing fluid substantially free of suspended solid material and comprising water, 1 to 5 per cent by weight of a water soluble salt of a carboxyalkyl cellulose ether and 1,000 to 25,000 P. P. M. of a metallic halide selected from the group consisting of alkali metal halides and alkaline earth metal halides.

2. The process of washing an oil or gas well containing a well drilling mud comprising the steps of replacing the drilling mud in the well with a well washing fluid substantially free of suspended solid material and comprising water, 1 to 5 per cent by weight of a water soluble salt of a carboxyalkyl cellulose ether and 1,000 to 25,000 P. P. M. of sodium chloride.

3. The process of washing an oil or gas well containing a well drilling mud comprising the steps of replacing the drilling mud in the well with a well washing fluid substantially free of suspended solid material and comprising water, 1 to 5 per cent by weight of a water soluble alkali metal carboxymethylcellulose and 1,000 to 25,000 P. P. M. of a metallic halide selected from the group consisting of alkali metal halides and alkaline earth metal halides.

WILLIAM E. BERGMAN.

REFERENCES CITED

The following references are of record in the file of this patent:

UNITED STATES PATENTS

| Number | Name | Date |
| --- | --- | --- |
| 2,135,909 | Monson | Nov. 8, 1939 |
| 2,232,946 | Hefley | Feb. 25, 1941 |
| 2,234,790 | Zacher | Mar. 11, 1941 |
| 2,322,484 | Stuart | June 22, 1943 |
| 2,324,254 | Bertness | July 13, 1943 |

OTHER REFERENCES

Cozzens: Brine Baths for Dirty Wells, article in The Oil Weekly, April 16, 1945, pages 54 and 56.

CMC—Bulletin of Hercules Powder Co., Cellulose Products Department, Wilmington 99, Delaware. Published 1945 (Her. 500-38-A 3M 5-46), pages 2 and 3. Copy in Division 64.

Certificate of Correction

Patent No. 2,470,132.  May 17, 1949.

WILLIAM E. BERGMAN

It is hereby certified that errors appear in the printed specification of the above numbered patent requiring correction as follows:

Column 3, line 51, for "of more" read *or more*; column 4, Table II, in the headings to columns 2 and 3 thereof, for

| Apparent 1% CMC | Height, mm. water |
|---|---| read

| Apparent Height, mm. | |
|---|---|
| 1% CMC | water | and that the said Letters Patent should be read with these corrections therein that the same may conform to the record of the case in the Patent Office.

Signed and sealed this 15th day of November, A. D. 1949.

[SEAL]

THOMAS F. MURPHY,
*Assistant Commissioner of Patents.*